(12) United States Patent
Riley et al.

(10) Patent No.: US 8,094,960 B2
(45) Date of Patent: Jan. 10, 2012

(54) SPECTRAL CALIBRATION OF IMAGE PAIRS USING ATMOSPHERIC CHARACTERIZATION

(75) Inventors: Ronald A. Riley, Melbourne, FL (US); Tariq Bakir, Melbourne, FL (US); Eric Spellman, Viera, FL (US); Thomas M. McDowall, Melbourne, FL (US)

(73) Assignee: Harris Corporation, Melbourne, FL (US)

( * ) Notice: Subject to any disclaimer, the term of this patent is extended or adjusted under 35 U.S.C. 154(b) by 855 days.

(21) Appl. No.: 12/168,224

(22) Filed: Jul. 7, 2008

(65) Prior Publication Data

US 2010/0002947 A1   Jan. 7, 2010

(51) Int. Cl.
  *G06K 9/40* (2006.01)
  *G06K 9/46* (2006.01)
(52) U.S. Cl. .............................. 382/254; 382/191
(58) Field of Classification Search .................. 382/100, 382/103, 162, 191, 203, 254, 274, 276, 286
See application file for complete search history.

(56) References Cited

U.S. PATENT DOCUMENTS

| | | |
|---|---|---|
| 5,034,986 A | 7/1991 | Karmann et al. |
| 5,265,172 A | 11/1993 | Markandey et al. |
| 5,324,113 A | 6/1994 | Ingram, Jr. et al. |
| 5,627,905 A | 5/1997 | Sebok et al. |
| 5,680,487 A | 10/1997 | Markandey |
| 5,884,226 A | 3/1999 | Anderson et al. |
| 5,949,914 A | 9/1999 | Yuen |
| 6,011,875 A | 1/2000 | Laben et al. |
| 6,097,835 A | 8/2000 | Lindgren |
| 6,937,774 B1 | 8/2005 | Specht et al. |
| 7,298,922 B1 | 11/2007 | Lindgren et al. |
| 7,369,229 B2 * | 5/2008 | Bissett et al. .............. 356/328 |

(Continued)

FOREIGN PATENT DOCUMENTS

CA   2670611 A1   6/2008

(Continued)

OTHER PUBLICATIONS

Aanaes, H., et al: "Spectrally Consistent Satellite Image Fusion With Improved Image Priors", 2006 7th Nordic Signal Processing Symposium (IEEE Cat. No. 06EX1392) IEEE Piscataway, NJ USA, Jun. 7, 2006-Jun. 9, 2006, pp. 14-17, XP002482502; ISBN: Jan. 4244-0413-4.

(Continued)

*Primary Examiner* — Yon Couso
(74) *Attorney, Agent, or Firm* — Fox Rothschild, LLP; Robert J. Sacco

(57) ABSTRACT

A system (100) for processing remotely acquired imagery is provided. The system (100) includes a storage element for receiving imagery data defining a first image of a panchromatic image type using a sensor characterized by a panchromatic spectral response curve and a second image of a multi-spectral image type using at least one other sensor characterized by a plurality of multi-spectral response curves associated with a plurality of optical bands. The first image has a first spatial resolution and a first spectral resolution. The second image has a second spatial resolution lower than the first spatial resolution and a second spectral resolution higher than that first spectral resolution. The system (100) also includes a processing element configured for deriving a radiation transfer model based on meta-data associated with one of the first and the second image and for determining a set of spectral weights for down-sampling the second image to the first spectral resolution based on the radiation transfer model and the panchromatic and the multi-spectral response curves.

20 Claims, 8 Drawing Sheets

U.S. PATENT DOCUMENTS

| | | | |
|---|---|---|---|
| 7,400,770 B2 * | 7/2008 | Keaton et al. ................ | 382/191 |
| 7,491,944 B1 * | 2/2009 | Stork et al. ............... | 250/390.07 |
| 7,620,203 B1 * | 11/2009 | Simmons et al. ............. | 382/103 |
| 2002/0096622 A1 | 7/2002 | Adler-Golden et al. | |
| 2004/0075667 A1 | 4/2004 | Burky et al. | |
| 2004/0130702 A1 | 7/2004 | Jupp et al. | |
| 2004/0141659 A1 | 7/2004 | Zhang | |
| 2004/0164235 A1 | 8/2004 | Miller | |
| 2004/0264796 A1 | 12/2004 | Turner et al. | |
| 2005/0094887 A1 | 5/2005 | Cakir et al. | |
| 2005/0111754 A1 | 5/2005 | Cakir et al. | |
| 2006/0126959 A1 | 6/2006 | Padwick et al. | |
| 2006/0269158 A1 | 11/2006 | O'Hara et al. | |
| 2008/0037865 A1 | 2/2008 | Vetter et al. | |
| 2008/0037869 A1 | 2/2008 | Zhou | |
| 2008/0089558 A1 | 4/2008 | Vadon et al. | |
| 2008/0112649 A1 | 5/2008 | Chen et al. | |
| 2008/0129752 A1 | 6/2008 | Riley et al. | |
| 2008/0131024 A1 | 6/2008 | Riley et al. | |
| 2008/0131025 A1 | 6/2008 | Riley et al. | |
| 2010/0008595 A1 | 1/2010 | Riley et al. | |
| 2010/0008598 A1 | 1/2010 | Riley et al. | |
| 2010/0032557 A1 * | 2/2010 | Schiller ...................... | 250/252.1 |
| 2010/0189363 A1 | 7/2010 | Riley et al. | |
| 2010/0226570 A1 | 9/2010 | Riley et al. | |

FOREIGN PATENT DOCUMENTS

| | | |
|---|---|---|
| WO | WO 98/41079 | 9/1998 |
| WO | WO 2006/065741 | 6/2006 |
| WO | WO 2008/070542 | 6/2008 |
| WO | WO 2008/070544 | 6/2008 |
| WO | WO-2008067517 | 6/2008 |

OTHER PUBLICATIONS

Ager; T.P., et al: "Geo-Positional Accuracy Evaluation of QuickBird Ortho-Ready Standard 2A Multispectral Imagery", Proceedings SPIE, Algorithms and Technologies for Multispectral, Hyperspectral, and Ultraspectral Imagery X, Aug. 12, 2004, pp. 488-499, XP040185047.

Aiazzi, B., et al: "Context-Driven Fusion of High Spatial and Spectral Resolution Images Based on Oversampled Multiresolution Analysis", IEEE Transactions on Geoscience and Remote Sensing, vol. 40, No. 10, Oct. 2002, pp. 2300-2312.

Becker, S., et al: 2005. "Determination and Improvement of Spatial Resolution for Digital Aerial Images", Proceedings of ISPRS Hannover Workshop 2005: High-Resolution Earth Imaging for Geospatial Information, unpaginated CD-ROM, 6p.

Beisl U.: "BDRF Correction in Hyperspectral Imagery", European Space Agency-Publications, 2001, XP002589098.

Beisl, U., et al: "Correction of Atmospheric and Bidirectional Effects in Multispectral ADS40 Images for Mapping Purposes", Internet, Intl. Arch. Photogramm. Remote Sens 2004, XP002588221, Retrieved from the Internet: URL:http://www2.geog.ucl.ac.uk/{mdisney/teaching/PPRS/PPRS_5/orig/atmos_empirical.pdf [retrieved on Jun. 14, 2010].

Eismann, M.T. et al: "Hyperspectral Resolution Enhancement Using High-Resolution Multispectral Imagery With Arbitrary Response Functions", IEEE Transactions on Geoscience and Remote Sensing, IEEE Service Center, Piscataway, NJ, US., vol. 43, No. 3, Mar. 2005, pp. 455-465, ISSN: 0196-2892, p. 456-459.

Garzelli, A., et al: "Interband Structure Modeling for Pan-Sharpening of Very High-Resolution Multispectral Images", Information Fusion Elsevier USA, vol. 6, No. 3, Sep. 2005, pp. 213-224, XP004858824, ISSN: 1566-2535.

Hardie R.C., et al: "MAP Estimation for Hyperspectral Image Resolution Enhancement Using an Auxiliary Sensor", IEEE Transactions on Image Processing, vol. 13, No. 9, Sep. 2004, pp. 1174-1184.

Perkins, T, et al.: "Retrieval of Atmospheric Properties from Hyper and Multispectral Imagery with the FLASH Atmospheric Correction Algorithm" SPIE, PO Box 10 Bellingham WA 98227-0010 USA, vol. 5979, Oct. 31, 2005, XP040211109.

Price J.C.: "Combining Panchromatic and Multispectral Imagery from Dual Resolution Satellite Instruments", Remote Sensing of Environment, No. 21, 1987, pp. 119-128, XP002588220.

Ranchin, T. et al: "Image Fusion—The ARSIS Concept and Some Successful Implementation Schemes" ISPRS J. Photogramm. Remote Sens.; ISPRS Journal of Photogrammetry and Remote Sensing, Jun. 2003, vol. 58, No. 1-2, pp. 4-18, XP002469989.

Richter et al.: "Influence of the Adjacency Effect on Ground Reflectance Measurements", IEEE Geoscience and Remote Sensing Letters, IEEE Service Center, New York, NY, US, vol. 3, No. 4, , Oct. 1, 2006, pp. 565-569, XP011149586, ISSN 1545-598X.

Schiefer, S. et al: Correcting Brightness Gradient in Hyperspectral Data From Urban Areas, Remote Sensing of Environment, No. 101, 2006, pp. 25-37, XP002588219.

Schowengerdt, R.: "Remote Sensing: Models and Methods for Image Processing", Dec. 31, 2007, Academic Press, XP002558565, ISBN: 9780123694072.

Thomas C. et al: "Synthesis of Multispectral Images to High Spatial Resolution: A Critical Review of Fusion Methods Based on Remote Sensing Physics" IEEE Transactions on Geoscience and Remote Sensing, IEEE Service Center, Piscataway, NJ, US, vol. 46, No. 5, May 2008, pp. 1301-1312.

Zhang, Y: "Understanding Image Fusion", Photogrammetric Engineering & Remote Sensing, Jun. 2004, pp. 657-661.

Xu, C, et al: "Evaluation of the Surface Reflectance Retrieval on the Satellite Data", SPIE, PO Box 10, Bellingham WA 98227-0010 USA, vol. 6752, Aug. 8, 2007, XP040247396.

Muhammad Murtaza Khan et al, Indusion: Fusion of Multispectral and Panchromatic Images Using the Induction Scaling Technique, IEEE Geoscience and Remote Sensing Letters, IEEE Service Center, Jan. 1, 2008, pp. 98-102, vol. 5, No. 1, New York, New York US.

Yongseung Kim et al, An Experimental Study on the Image-Based Atmospheric Correction Method for High Resolution Multispectral Data, Geoscience and Remote Sensing Symposium, 2005, lgarss 2005, Proceedings, 2005 IEEE International Seoul, Korea, Jul. 25-29, 2005, pp. 434-436, vol. 1, Piscataway, New Jersey USA.

J.G. Liu, Smoothing Filter Based Intensity Modulation: A Spectral Preserve Image Fusion Technique for Improving Spatial Details, Int. J. Remote Sensing, Dec. 2000, pp. 3461-3472, vol. 21, No. 18.

Bunting P et al: "An Area based Technique for Image-to-Image Registration of Multi-Modal Remote Sensing Data", Geoscience and Remote Sensing Symposium, 2008. IGARSS 2008. IEEE International, IEEE, Piscataway, NJ, USA, Jul. 7, 2008, pp. V-212, XP031423198.

Walli K C: "Automated multisensor image registration", Applied Imagery Pattern Recognition Workshop, 2003. Proceedings. 32ND Washington, DC, USA Oct. 5-17, 2003, Piscataway, NJ, USA, IEEE, Oct. 15, 2003, pp. 103-107, XP010695062.

Lemoigne J. et al: "Use of Multiresolution Wavelet Feature Pyramids for Automatic Registration of Multisensor Imagery", IEEE Transactions on Image Processing, IEEE Service Center, Piscataway, NJ, US, vol. 14, No. 6, Jun. 1, 2005 92005-06-01), pp. 770-782, XP011131847.

Chi-Farn Chen et al: "Fully Automatic and Robust Approach for Remote Sensing Image Registration", Nov. 13, 2007, Progress in Pattern Recognition, Image Analysis and Applications; [Lecture Notes in Computer Science], Springer Berlin Heidelberg, Berlin, Heidelberg, pp. 891-900, XP019083038.

International Search Report mailed Jan. 11, 2011; International Application No. PCT/US2009/049855 in the name of Harris Corporation.

Alparone, L., et al. "Comparison of Pansharpening Algorithms: Outcome of the 2006 GRS-S Data-Fusion Contest," Geoscience and Remote Sensing, IEEE Transactions on Geoscience and Remote Sensing, vol. 45, No. 10, pp. 3012-3021, Oct. 2007 doi: 10.1109/TGRS.2007.904923.

Garzelli, A.; Nencini, F.; Capobianco, L.; , "Optimal MMSE Pan Sharpening of Very High Resolution Multispectral Images," Geoscience and Remote Sensing, IEEE Transactions on , vol. 46, No.

1, pp. 228-236, Jan. 2008 doi: 10.1109/TGRS.2007.907604 URL: http://ieeexplore.ieee.org/stamp/stamp.jsp?tp= &arnumber=4389066&isnumber=4407619.

Yang, Y. et al., "An Overview on Pixel-Level Image Fusion in Remote Sensing," Automation and Logistics, 2007 IEEE International Conference on , vol., No., pp. 2339-2344, Aug. 18-21, 2007 doi: 10.1109/ICAL.2007.4338968 URL: http://ieeexplore.ieee.org/stamp/stamp.jsp?tp=&arnumber=4338968&isnumber=4338503.

Zheng, S., et al., "Remote Sensing Image Fusion Using Multiscale Mapped LS-SVM," Geoscience and Remote Sensing, IEEE Transactions on , vol. 46, No. 5, pp. 1313-1322, May 2008 doi: 10.1109/TGRS.2007.912737 URL: http://ieeexplore.ieee.org/stamp/stamp.jsp?tp=&arnumber=4444632&isnumber=4490048.

Joshi, M.; Jalobeanu, A., "Multiresolution Fusion in Remotely Sensed Images Using an IGMRF Prior and Map Estimation," Geoscience and Remote Sensing Symposium, 2008. IGARSS 2008. IEEE International , vol. 2, No., pp. II-269-11-272, Jul. 7-11, 2008 doi:10.1 109/IGARSS.2008.4778979.

* cited by examiner

SPECTRAL CALIBRATION OF IMAGE PAIRS USING ATMOSPHERIC CHARACTERIZATION

BACKGROUND OF THE INVENTION

1. Statement of the Technical Field

The invention concerns image processing, and more particularly, an image processing method for images having different spatial and spectral resolutions.

2. Description of the Related Art

In the field of remote image sensing, two common types of images include panchromatic imagery and multi-spectral imagery. Panchromatic imagery is imagery that is obtained by a remote sensing device with a sensor designed to detect electromagnetic energy in only one very broad band. This one very broad band typically includes most of the wavelengths of visible light. Panchromatic imagery has the advantage of offering very high spatial resolution. In contrast, multi-spectral imagery is typically created from several narrow spectral bands within the visible light region and the near infrared region. Consequently, a multi-spectral image is generally comprised of two or more image data sets, each created by sensors responsive to different portions of the optical spectrum (e.g., blue, green, red, infrared). Multi-spectral images are advantageous because they contain spectral information which is not available from a similar panchromatic image. However, multi-spectral images typically have a lower spatial resolution as compared to panchromatic images.

It is often desirable to enhance a multi-spectral image with the high resolution of a panchromatic image and vice versa. Typically this process is referred to as "fusion" of the image pair. In general, there are several requirements for successfully accomplishing the fusion process. One requirement is to ensure that the radiance values of the fused image remain consistent with both the original multi-spectral image and the original panchromatic image. Typically, this requires some means of obtaining an estimate of the weights that should be applied to radiance values for pixels associated with each band of wavelengths in the fused image. If these weights are known, then it is possible to make an accurate comparison of the radiance values of pixels in the multi-spectral image to the pixels in the original panchromatic image.

Unfortunately, conventional algorithms utilized for performing the image fusion process suffer from several limitations. For example, spectral weights are typically based solely on known sensor characteristics. That is, spectral weights are typically fixed for a given sensor, modulated only by variations in spectral calibration. However, even when the spectral weights are not based solely on sensor characteristics, the obtained spectral weights are still essentially fixed for the given sensor. For example, even though spectral weights can be estimated for a particular sensor and some general imaging conditions, this estimation is typically based on a limited number of pre-selected image pairs.

SUMMARY OF THE INVENTION

The present invention concerns systems and methods for adjusting remotely acquired imagery, such as image data from panchromatic and multi-spectral image pairs, based on local effects, such as local atmospheric conditions and the surface reflectance of objects being imaged. In a first embodiment of the present invention, a method for processing remotely acquired imagery is provided. The method includes obtaining imagery data defining a first image of a panchromatic image type using a sensor characterized by a panchromatic spectral response curve, the first image having a first spatial resolution and a first spectral resolution. The method further includes obtaining imagery data defining a second image of a multi-spectral image type using at least one other sensor characterized by a plurality of multi-spectral response curves associated with a plurality of optical bands, the second image having a second spatial resolution lower than the first spatial resolution and a second spectral resolution higher than that first spectral resolution. The method also includes deriving a radiation transfer model based on meta-data associated with at least one of the first and second images. The method additionally includes determining a set of spectral weights for down-sampling the second image to the first spectral resolution based on the radiation transfer model and the panchromatic and the multi-spectral response curves.

In a second embodiment of the present invention, a system for processing remotely acquired imagery is provided. The system includes a storage element for receiving imagery data defining a first image of a panchromatic image type using a sensor characterized by a panchromatic spectral response curve and a second image of a multi-spectral image type using at least one other sensor characterized by a plurality of multi-spectral response curves associated with a plurality of optical bands. The first image has a first spatial resolution and a first spectral resolution. The second image has a second spatial resolution lower than the first spatial resolution and a second spectral resolution higher than that first spectral resolution. The system also includes a processing element configured for deriving a radiation transfer model based on meta-data associated with one of the first and the second image and for determining a set of spectral weights for down-sampling the second image to the first spectral resolution based on the radiation transfer model and the panchromatic and the multi-spectral response curves.

In a third embodiment of the present invention, a computer-readable storage, having stored thereon a computer program for processing remotely acquired imagery is provided. The computer program includes a plurality of code sections executable by a computer. The code sections cause the computer to perform the steps of: obtaining imagery data defining a first image of a panchromatic image type using a sensor characterized by a panchromatic spectral response curve, the first image having a first spatial resolution and a first spectral resolution; obtaining imagery data defining a second image of a multi-spectral image type using at least one other sensor characterized by a plurality of multi-spectral response curves associated with a plurality of optical bands, the second image having a second spatial resolution lower than the first spatial resolution and a second spectral resolution higher than that first spectral resolution; based on meta-data associated with at least one of the first and the second image, deriving a radiation transfer model; and determining a set of spectral weights for down-sampling the second image to the first spectral resolution based on the radiation transfer model and the panchromatic and the multi-spectral response curves.

DETAILED DESCRIPTION

Embodiments of the present invention provide systems and methods for adjusting remotely acquired imagery, such as image data from panchromatic and multi-spectral image pairs, based on local effects, such as local atmospheric conditions and the surface reflectance of objects being imaged. As previously described, the fusion process for the combination of panchromatic and multi-spectral image pairs requires some amount of spectral calibration to properly combine the images. Typically, such a calibration is fixed, based on sensor characteristics or a set of calibration image pairs. Unfortunately, the result of using a fixed spectral calibration scheme is that atmospheric effects that vary from image pair to image pair are not considered during the fusion process, so that images are adjusted without regard to the impact of atmospheric conditions on the acquired images. As a result, some or all of the images to be combined are typically not properly adjusted, via spectral calibration, prior to the generation of a fused image. Accordingly, the final combined image is typically a combination of under and/or over compensated images, resulting in obscuring of details or other reductions in combined image quality.

The inventors have discovered that one method for improving the quality of fused images is to extend spectral calibration methods for fusing images to account for local effects based on atmospheric modeling using a radiation transfer model. The inventors note that even though a radiation transfer model describes illumination conditions generally, these general illumination conditions are sufficient to provide an improved spectral calibration based on both sensor characteristics and atmospheric effects. Therefore, the various embodiments of the present invention provide for generating a set of spectral weights for image pair fusion processes, where the spectral weights are based both the spectral response curves for the images (sensor configuration) and a reflectance function for the location being imaged (based on the radiation transfer function).

Figure 1:
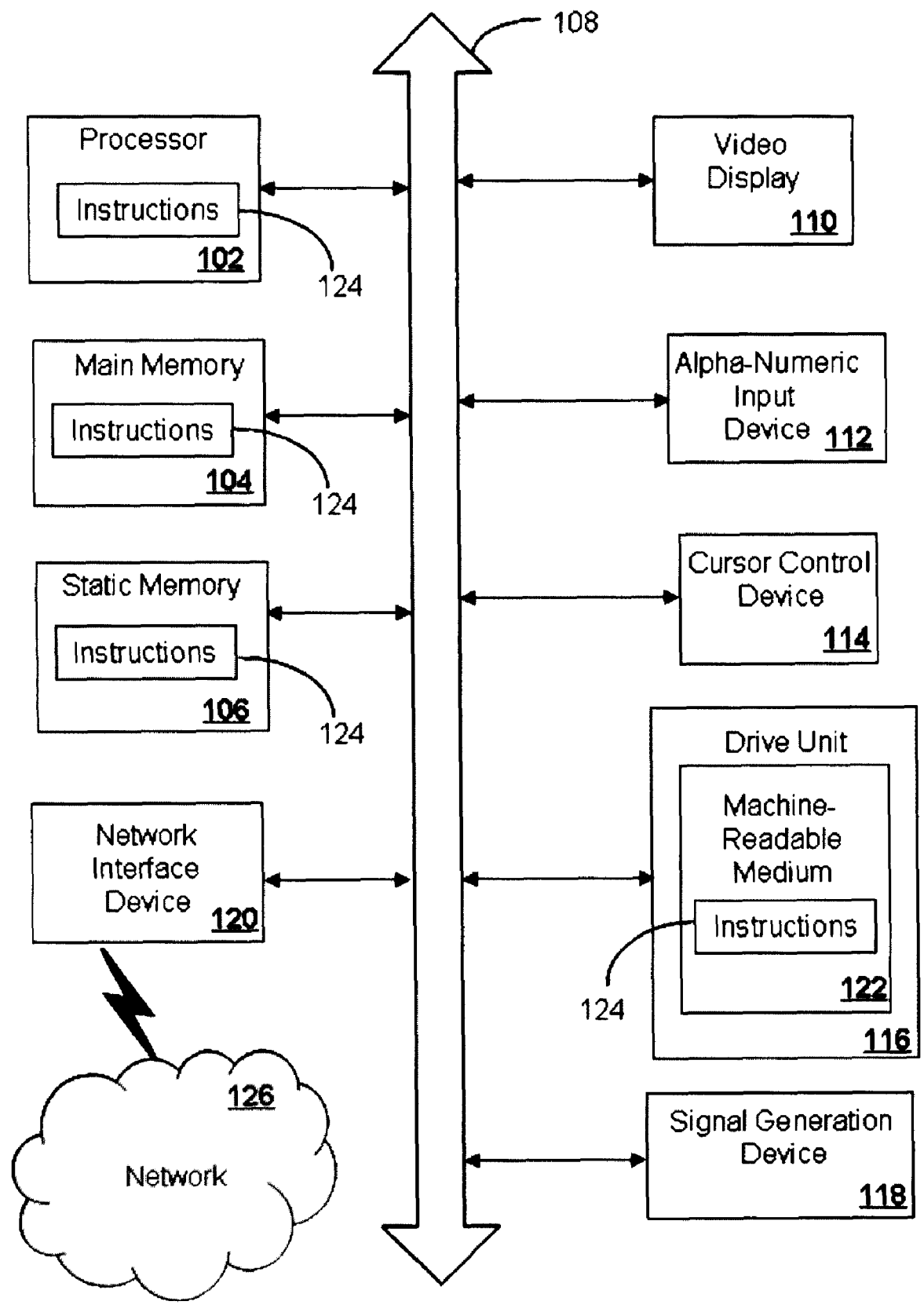
FIG. 1 is a schematic view of a computer system within which a set of instructions operate according to an embodiment of the invention.

The various embodiments of the present invention are specifically embodied as a method, a data processing system, and a computer program product for generating mapping functions for image pairs. Accordingly, the present invention can take the form as an entirely hardware embodiment, an entirely software embodiment, or any combination thereof. However, the invention is not limited in this regard and can be implemented in many other forms not described herein. For example, FIG. 1 is a schematic diagram of an embodiment of a computer system 100 for executing a set of instructions that, when executed, causes the computer system 100 to perform one or more of the methodologies and procedures described herein. In some embodiments, the computer system 100 operates as a standalone device. In other embodiments, the computer system 100 is connected (e.g., using a network) to other computing devices. In a networked deployment, the computer system 100 operates in the capacity of a server or a client developer machine in server-client developer network environment, or as a peer machine in a peer-to-peer (or distributed) network environment.

In the some embodiments, the computer system 100 can comprise various types of computing systems and devices, including a server computer, a client user computer, a personal computer (PC), a tablet PC, a laptop computer, a desktop computer, a control system, a network router, switch or bridge, or any other device capable of executing a set of instructions (sequential or otherwise) that specifies actions to be taken by that device. It is to be understood that a device of the present disclosure also includes any electronic device that provides voice, video or data communication. Further, while a single computer is illustrated, the phrase "computer system" shall be understood to include any collection of computing devices that individually or jointly execute a set (or multiple sets) of instructions to perform any one or more of the methodologies discussed herein.

The computer system 100 includes a processor 102 (such as a central processing unit (CPU), a graphics processing unit (GPU, or both), a main memory 104 and a static memory 106, which communicate with each other via a bus 108. The computer system 100 further includes a display unit 110, such as a video display (e.g., a liquid crystal display or LCD), a flat panel, a solid state display, or a cathode ray tube (CRT)). The computer system also includes an input device 112 (e.g., a keyboard), a cursor control device 114 (e.g., a mouse), a disk drive unit 116, a signal generation device 118 (e.g., a speaker or remote control) and a network interface device 120.

The disk drive unit 116 includes a computer-readable storage medium 122 on which is stored one or more sets of instructions 124 (e.g., software code) configured to implement one or more of the methodologies, procedures, or functions described herein. The instructions 124 reside, completely or at least partially, within the main memory 104, the static memory 106, and/or within the processor 102 during execution thereof by the computer system 100. The main memory 104 and the processor 102 also can constitute machine-readable media.

Those skilled in the art will appreciate that the computer system architecture illustrated in FIG. 1 is one possible example of a computer system. However, the invention is not limited in this regard and any other suitable computer system architecture can also be used without limitation.

For example, dedicated hardware implementations including, but not limited to, application-specific integrated circuits, programmable logic arrays, and other hardware devices can likewise be constructed to implement the methods described herein. Applications that can include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the exemplary system is applicable to software, firmware, and hardware implementations.

In accordance with various embodiments of the present invention, the methods described below can be stored as software programs in a computer-readable storage medium and can be configured for running on a computer processor. Furthermore, software implementations can include, but are not limited to, distributed processing, component/object distributed processing, parallel processing, virtual machine processing, which can also be constructed to implement the methods described herein.

Therefore, in some embodiments of the present invention, the present invention is embodied as a computer-readable storage medium containing instructions 124 or that receives and executes instructions 124 from a propagated signal so that a device connected to a network environment 126 sends or receive voice and/or video data and that communicate over the network 126 using the instructions 124. The instructions 124 are further transmitted or received over a network 126 via the network interface device 120.

While the computer-readable storage medium 122 is shown in an exemplary embodiment to be a single storage medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure.

The term "computer-readable medium" shall accordingly be taken to include, but not be limited to, solid-state memories such as a memory card or other package that houses one or more read-only (non-volatile) memories, random access memories, or other re-writable (volatile) memories; magneto-optical or optical medium such as a disk or tape; as well as carrier wave signals such as a signal embodying computer instructions in a transmission medium; and/or a digital file attachment to e-mail or other self-contained information archive or set of archives considered to be a distribution medium equivalent to a tangible storage medium. Accordingly, the disclosure is considered to include any one or more of a computer-readable medium or a distribution medium, as listed herein and to include recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, and HTTP) represent examples of the state of the art. Such standards are periodically superseded by faster or more efficient equivalents having essentially the same functions. Accordingly, replacement standards and protocols having the same functions are considered equivalents.

Figure 2:
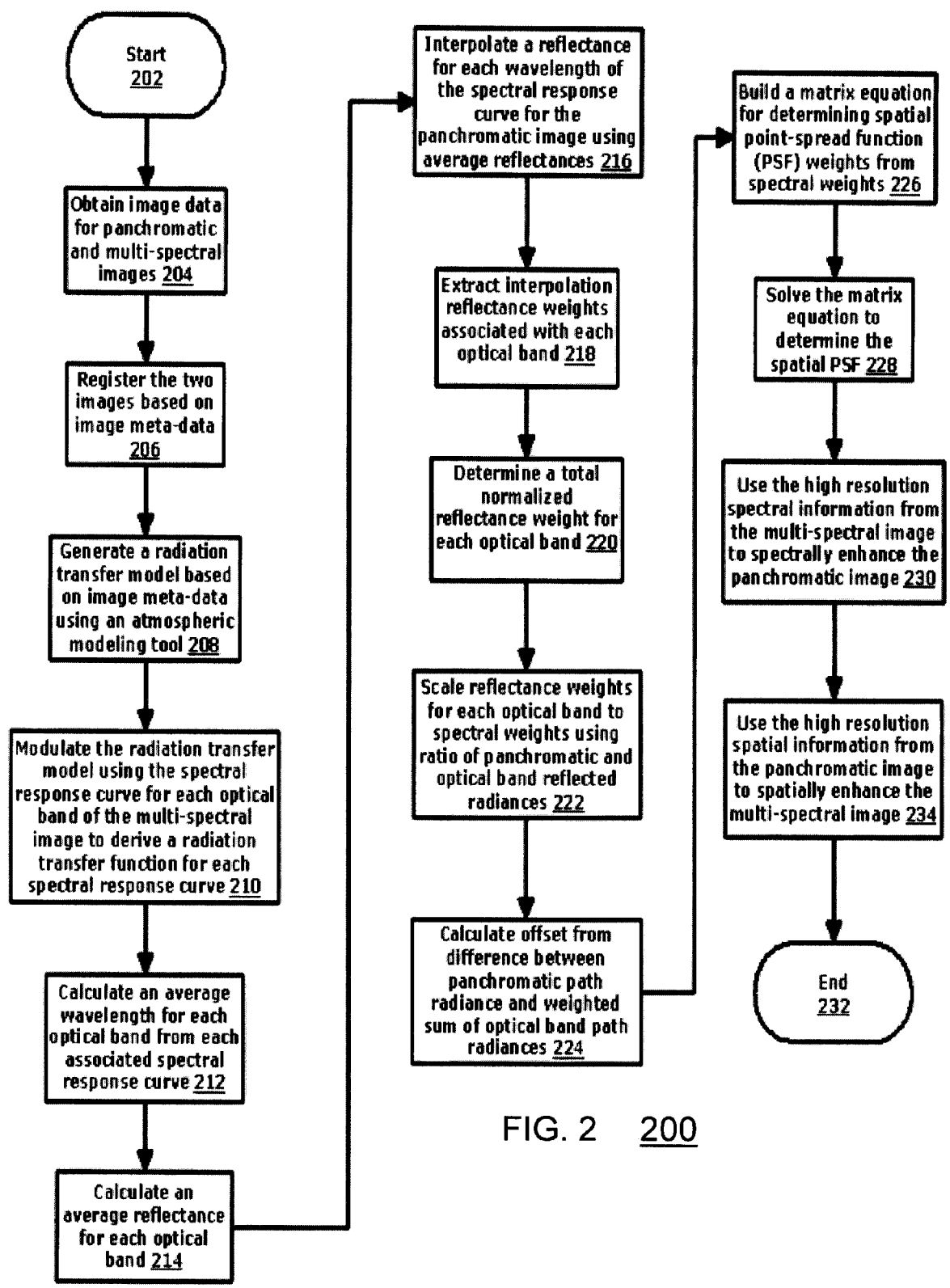
FIG. 2 is a flowchart of steps in an exemplary method for processing remotely acquired imagery according to an embodiment of the present invention.

The present invention will now be described in greater detail in relation to the flowchart in FIG. 2, illustrating steps in an exemplary method 200 for processing remote imagery data based according to the various embodiments of the present invention. It should be appreciated, however, that the exemplary process disclosed in FIG. 2 is provided for purposes of illustration only and that the present invention is not limited in this regard.

As shown in FIG. 2, the method 200 starts with step 202 and continues on to step 204. In step 204, the remote imagery data is obtained. As used herein, "remote imagery data" refers to any set of data defining an image pair. That is, the remote imagery data includes image data and any type of meta-data associated with a first and at least a second image to be combined. The image data is acquired from any remotely positioned sensor or imaging device. For example, the remote sensor can be positioned to operate on, by way of example and not limitation, an elevated viewing structure, an aircraft, a spacecraft, or man-made satellite. That is, the remote data is acquired from any position, fixed or mobile, that is elevated with respect to the imaged location. The image data can include light intensity data for an image acquired using only a particular range of wavelengths (i.e., a spectral band). Therefore, in the various embodiments of the present invention, the remote imagery data comprises multi-spectral (~4 bands), hyper-spectral (>100 bands), and/or panchromatic (visible band) image data.

The remote imagery data described herein are further assumed to have certain other characteristics. During the time between collection of the various images, moving objects such as vehicles and ocean waves are not likely to be registered correctly between the two images, leading to error in registration and calibration. If the time between the acquisitions of the images is more than a few minutes, the change in position of the sun will result in significant changes in shadows and variations in the illumination of the surface based on how well the surface normals are aligned with the sun. This can result in significant calibration and registration errors. If days pass between the collection of the images, there can be significant changes in atmospheric conditions. If months pass, there can be significant changes in the surface properties due to ice, snow, rain, leaves falling from the trees, new growth. Therefore, one of ordinary skill in the art will recognize that better results are obtained in subsequent processes for combining the images if the different images can be acquired within a very short time frame of each other. Similarly, the different images can also be acquired from nearly the same position to further reduce registration errors. Still, it will be understood by those skilled in the art that the present invention can be utilized in connection with different images that do not satisfy these criteria, possibility with degraded results. Accordingly, image pairs can be obtained using differently positioned sensors, obtained at different times, or both. However, such image pairs can result in more complex registration processes, including more complex or multiple shifting, scaling, and rotation processes. As used herein, a "composite image" refers to any image resulting from the combination of any types of image data. For example, a composite image is produced from the combination of the image data from each spectral band in multi-spectral or hyper-spectral imagery. However, the invention is not limited in this regard and a composite image can be produced from the fusion of multi-spectral or hyper-spectral image data with panchromatic image data.

For exemplary method 200, the remote imagery data comprises an image pair including panchromatic and multi-spectral images and associated meta-data. By way of example and not limitation, the meta-data includes information identifying a date, a time, and the geographic location for the images. For example, geographic coordinates for the four corners of a rectangular image can be provided in the meta-data. Other information can also be included in the meta-data, including any additional information regarding the sensor or the location being imaged.

Once the image pair is obtained in step 204, the image pair is aligned or registered in step 206. In general, step 206 involves generating a mapping function based on a determination of where each point in the panchromatic image maps to in the multi-spectral image. A number of conventional methods exist for registering images. Typically, they involve selecting a number of points in one image, finding where they map to in the other image, and then optimizing the coefficients of a transform function. This is usually a least squares error solution that permits one to obtain a set of coefficients that minimize the squared error of mapping points from one image to another. For best results in the fusion process, the panchromatic image is preferably mapped to the multi-spectral image with an accuracy defined by a error distance which is less than a dimension defined by 0.1 panchromatic pixel. In the various embodiments of the present invention, the mapping can be as simple as a linear transformation of the form $x_1=ax_2+by_2+x_0$, or as complex as a transformation modeling the geometry and configuration of the sensors and the surface imaged.

Figure 3:
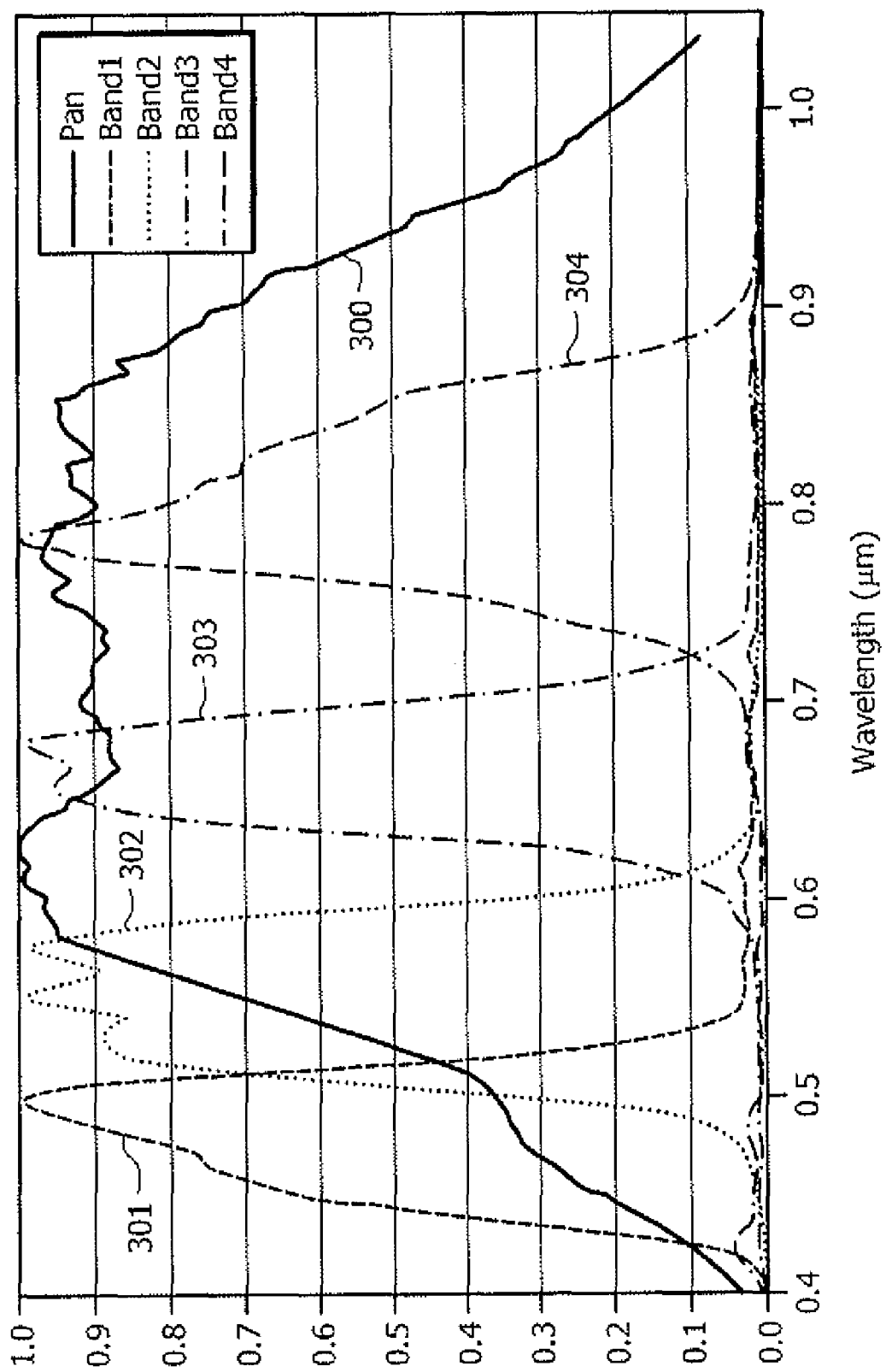
FIG. 3 is a plot showing an example of a spectral response of sensors used to create a panchromatic image and a multi-spectral image that is useful for describing the present invention.

One of ordinary skill in art will recognize that a multi-spectral image of a particular scene is actually comprised of several optical or spectral image bands. In each of these optical bands the sensor is responsive to a very limited range of optical wavelengths. This concept is illustrated in FIG. 3 which shows curves 301, 302, 303, 304 which represent a sensor's response to four different optical bands. Thus, the sensor essentially creates one image for each optical band represented by each of the response curves 301, 302, 303, 304. Those skilled in the art will appreciate that different sensor systems can have more or fewer optical bands and accordingly, more or fewer spectral response curves for each optical band. In contrast, a panchromatic image is a single image which is obtained by a sensor that is responsive to a much wider range of optical wavelengths. In FIG. 3, the response of the panchromatic sensor is illustrated by curve 300.

In FIG. 3, it can be seen that the response curves 301, 302, 303, 304 of the sensor for the various multi-spectral bands can be very different as compared to the response curve 300 of the panchromatic sensor for the same wavelengths. These differences in the responsiveness of the sensor to the various optical bands will result in scaling differences as between the radiance values associated with each pixel for the multi-spectral image as compared to the panchromatic image. Therefore, although the panchromatic image can be approximated using a combination of the images formed from the different bands of the multi-spectral images, a calibration of each of the optical band is needed. Therefore, a calibration function is needed to scale the radiance values for each pixel as measured by each optical band for the multi-spectral sensor to provide a proper scaling of radiance values to generate radiance values detected by the panchromatic sensor. For example, consider the spectral response represented by curves 300 and 301 at 0.5 μm. The curve 301 has a spectral response of approximately 1.0 whereas the spectral response of the panchromatic sensor shows an average spectral response in the range of about 0.35. Ignoring for the moment the response of curve 302 in the wavelength range defined by curve 301, the radiance values for pixels in a multi-spectral image using a sensor having the characteristics of response curve 301 would likely need to be scaled by a weighting value of about 0.35 in order for such radiance values to be properly calibrated to those values measured by a sensor having the response indicated by curve 300.

Figure 4:
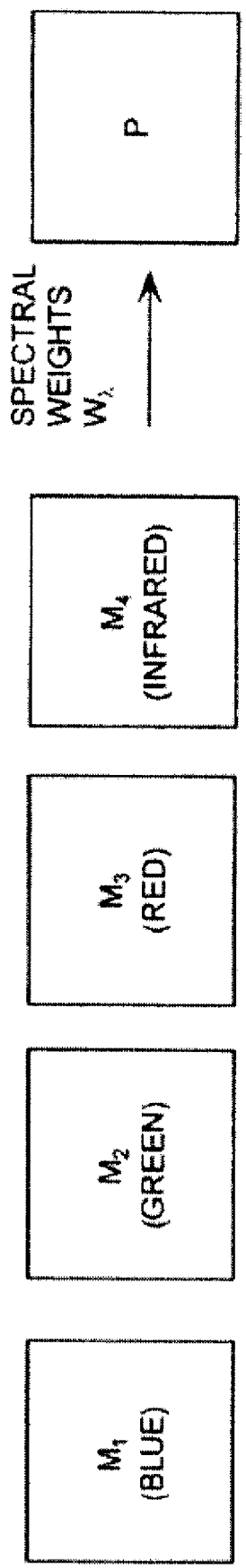
FIG. 4 is a conceptual illustration showing how spectral weights are used for approximating a panchromatic image using pixels from a multi-spectral image that is useful for describing the present invention.

Therefore, with proper spectral calibration the pixel radiance values associated with each optical band in FIG. 3 can be added together to obtain an approximated panchromatic image in which the total radiance value is the sum of scaled radiance values obtained using a sensor having the response defined by curve 300. This process is conceptually illustrated in FIG. 4. Mathematically, this process can be expressed as follows in equation (1):

$$P_{MSI}(i, j) = \sum_b W_\lambda M_\lambda(i, j) + P_0 \qquad (1)$$

Where:
$P_{MSI}(i,j)$ is the approximated panchromatic radiance of each down-sampled pixel;
$W_\lambda$ are the spectral weights for each of the spectral bands, b;
$M_\lambda(i,j)$ is the radiance value for each pixel for each spectral band comprising the multi-spectral image; and
$P_0$ is a constant offset value.

Thus, once the spectral weights are selected for each band, the approximated panchromatic image can be formed using the multi-spectral image data. However, as previously described, such a combined image typically fails to include local effects, in particular surface reflectance of illuminated objects and atmospheric effects on light reflected from the illuminated objects. In other words, even though the sensitivity to different wavelengths of light can be constant for each optical band sensor, the amount of light reaching the sensors varies due to atmospheric conditions, such as visibility, and the surface reflectance $R(\lambda)$ of objects being illuminated. Therefore, since surface reflectance $R(\lambda)$ essentially specifies how much light of a particular wavelength is reflected back towards the sensor, the surface reflectance $R(\lambda)$ effectively describes how to modify the spectral response curves. For example, referring back to FIG. 3, the spectral response of curve 301 peaks at approximately 0.5 um, as previously described. However, if the fraction of the light at 0.5 um reflected by a surface is small (i.e., R(0.5 um) is less than 1), the sensitivity of the sensor to 0.5 um is effectively reduced. Furthermore, as light reaching the sensor is also affected by illumination conditions, sensitivity of the sensor is further reduced as atmospheric effects, such as low visibility, further reduce the amount of light reaching the sensor. Therefore, in the various embodiments of the present invention, the spectral weights are further refined to account for surface reflectance and atmospheric conditions. In particular, a set of reflectance weights are determined based on a radiation transfer model and are used to derive final spectral weights, as described below. A "radiation transfer model", as used herein, refers to a mathematical description of how a location is illuminated, that is the total radiance observed at a point, such as at in a sensor for acquiring remote imagery.

Accordingly, to include the local effects described above, alone or in combination with step 206, method 200 provides for generating the radiation transfer model in step 208. That is, based on the meta-data associated with the image, an atmospheric modeling tool is used to derive a model of the illumination of an imaged location. In other words, a model of how the radiance collected by a sensor is affected by conditions in the atmosphere is derived. Typically, local effects on radiance from a combination of panchromatic and multi-spectral sensors cannot be directly obtained from acquired image data. However, illumination conditions during acquisition of remotely acquired images can be modeled using atmospheric modeling tools. For example, one atmospheric modeling tool, MODTRAN, developed by the U.S. Air Force, can generate a radiation transfer model based on date, time, and location information. Additionally, atmospheric modeling tools such as MODTRAN can also use observed or estimated atmospheric conditions affecting local illumination conditions, such as visibility measurements, to generate the radiation transfer model. However, the invention is not limited in this regard, and any other type of atmospheric modeling tool using any number of parameters can be used with the various embodiments of the present invention.

Figure 5:
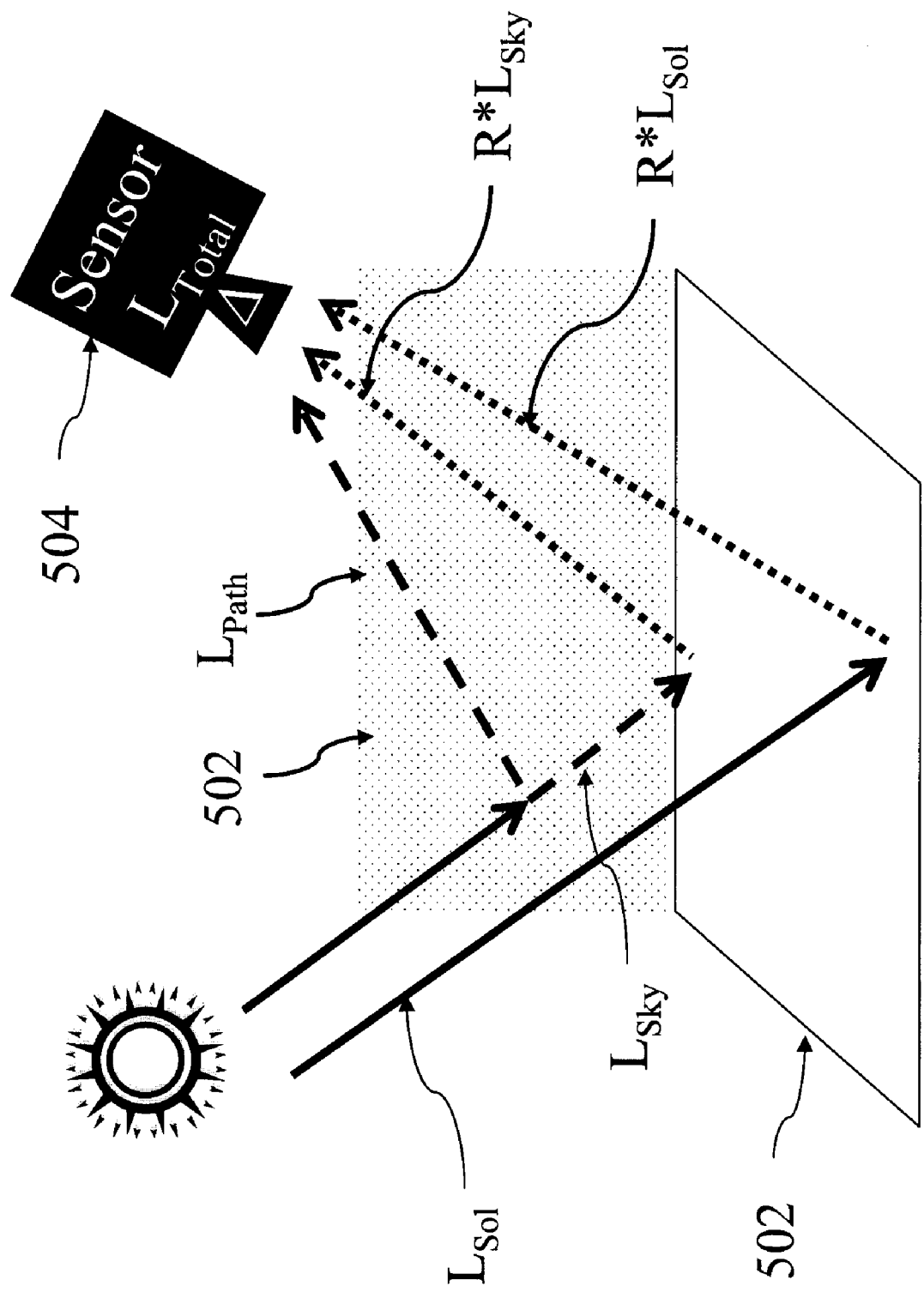
FIG. 5 is a conceptual illustration showing the various components of the radiance collected by a remote sensor that is useful for describing the present invention.

Typically, the total radiance collected by a sensor is represented or modeled by the sum of an atmospheric reflected component and a surface reflected component. This is conceptually illustrated in FIG. 5. In FIG. 5, the sun or other light source provides a total amount of radiance $L_{Total\_Sol}$ directed to a surface 502 being imaged. A portion of this total radiance is reflected upwards by the atmosphere 504, resulting in a radiance $L_{Path}$ describing the upwelling path radiance. A second portion of this total radiance is reflected and/or scattered by the atmosphere 504 downwards towards the surface 502, resulting in a radiance $L_{Sky}$ describing the "blue-sky" radiance. A third portion of this total radiance reaches the surface 502, resulting in a radiance $L_{Sol}$ describing direct solar radiance on surface 502. Therefore, a sensor 506 ultimately detects a total radiance $L_{Total}$ based on the amount of upwelling path radiance $L_{Path}$ reaching the sensor 506 and the amount of direct solar radiance $L_{Sol}$ and blue-sky radiance $L_{Sky}$ reflected by the surface 502 and reaching the sensor 506. Mathematically, this total radiance collected by a sensor can be described as follows in equation (2):

$$L_{Total}(\lambda) = L_{path}(\lambda) + R(\lambda)[L_{Solar}(A)\cos(A) + L_{Sky}(\lambda)] \quad (2)$$

Where:
$L_{path}(\lambda)$ is the path radiance collected by the sensor,
$R(\lambda)$ is the surface reflectance for a particular wavelength of light,
$L_{Solar}(\lambda)$ is the surface reflected direct solar radiance,
$L_{Sky}(\lambda)$ is the surface reflected blue-sky radiance, and
$\cos(A)$ is the dot product of the surface normal with the solar unit vector which can be assumed constant over the scene for a flat surface being imaged.

Equation (2) can rearranged to mathematically describe the reflectance of a particular wavelength of light based on the modeled radiances as follows in equation (3):

$$R(\lambda) = [L_{Total}(\lambda) - L_{path}(\lambda)] / [L_{Solar}(\lambda)\cos(A) + L_{Sky}(\lambda)] \quad (3)$$

Although surface reflectance $R(\lambda)$ is typically insensitive to atmospheric conditions, in the case of atmospheric modeling, any extracted reflectances include a component due to atmospheric scattering of light. Therefore, in the various embodiments of the present invention, the surface reflectance $R(\lambda)$ is extracted from the radiation transfer model and used as both a measure of actual surface reflectance and a measure of how atmospheric conditions alter the radiation transfer function.

Therefore, once the radiation model is determined in step 208, a radiation model is generated for each spectral band of the multi-spectral image in step 210. In particular, a radiation model for each spectral band can be generated by modulating the radiation transfer model based on the spectral response for each spectral band. That is, the spectral response of each spectral band can be used as a filter function for the radiation transfer function derived by the atmospheric modeling tool. Afterward, a reflectance value, i.e., a form of equation (3) is derived for each spectral band of each pixel based on an assumed value of the facet orientation angle in step 210. This reflectance value is averaged over the spectral response of the band, effectively weighted by the spectrum illuminating the surface imaged by the pixel. The true reflectance value is a property of the surface alone. When we do not have information about the orientation of the surface imaged relative to the sun, which is generally the case, the estimated reflectance will be qualitative but not exact reflecting this ambiguity. Because the pan and MSI image the same scene with the same illumination, assuming the same value for surface orientation for both images removes the impact of the ambiguity in the estimated reflectances as the deviation between true and assumed orientation impacts both images in exactly the same way.

It is common practice to assume that the reflectance spectra of most surface materials varies smoothly as a function of wavelength over the spectrum of interest. Thus the reflectance spectra over the entire spectral response of the pan sensor can be estimated by interpolating the reflectance values estimated for the MSI bands. Though the estimated reflectance is averaged of the bands spectral range, we approximate it as a sample at the center wavelength of the band. Thus the reflectance of each pixel is estimated at each wavelength of the high resolution atmospheric model and modulated with the pan spectral response to estimate the pan reflectance value for each pixel.

Interpolating the MSI band reflectances defines a linear weighting at each wavelength between bands. The integration of these interpolations in finding the reflectance value of the pan averages these weights of the bands over the pan spectral band, which can be reduced to the desired mixing weights for reflectance. Once the weights for mixing reflectances have been determined, the weights and offsets for converting radiance from MSI to pan can be computed based on the atmospheric model.

As previously described, a set of spectral weights typically needs to be calculated in order to correctly combine image pairs into a single image. Thus, for each band a single spectral weight $W_b$ is typically calculated and applied to each pixel in each image to determine the pixel's radiance contribution to the approximated panchromatic image. However, as previously described, one aspect of the present invention provides for determining a contribution to the spectral weights $W_b$ of the reflectance functions generated in step 210 for each of the optical bands of the multi-spectral image. In particular, this requires the calculation of a set of surface reflectance weights associated with each optical band for determining a total surface reflectance at each wavelength of panchromatic band. In the various embodiments of the present invention, the reflectance weights can be estimated based on smoothly interpolating the estimated reflectance of the MSI bands to over the entire pan spectral range. The reflectance weights can then be converted to radiance weights based radiometric calibration coefficients for each band. Typically, such a determination would require the determination of a surface reflectance at each wavelength and determining the contribution of each optical band to the surface reflectance at each wavelength, increasing computation time. However, the inventors have discovered that although some variations in radiance, and thus also in surface reflectance, occur over the range of wavelengths in each optical band, these variations can be assumed to be small over the limited range of wavelengths in each optical band. Accordingly, the total surface reflectance for each optical band can be estimated as the weighted sum of the average surface reflectance values from each band. Furthermore, because the surface reflectance is assumed to be the same over the range of wavelengths in the optical band, the average surface reflectance values need only be calculated at an average wavelength of the band. Therefore, separately or in combination with steps 204-212, an average wavelength for each spectral band is calculated if it is not already known. Various methods exist for determining an average value of a function and any can be used with the various embodiments of the present invention. For example, a mean value theorem calculation can be used as shown below:

$$f(\lambda_{avg}) = \int_x^y f(\lambda)d\lambda/(y-x) \quad (4)$$

where f(λ) describes a particular spectral response curve. Therefore, once the average wavelength of each spectral response curve is calculated in step 212, the average reflectance of each spectral response curve, and thus each optical band, is calculated in step 214.

As previously described, the average surface reflectance for each optical band would normally be weighted and summed to determine the total surface reflectance at a particular wavelength of the panchromatic band. However, because the optical bands are typically narrow in range, the inventors have discovered that a further assumption can be made that the surface reflectance at a given wavelength of the panchromatic band is only based on the average surface reflectance of the optical bands that would contribute to the approximated panchromatic image. That is, only the average surface reflectances for the closest optical bands to the wavelength of the panchromatic image. For example, referring back to FIG. 3, at a wavelength of 0.5 µm a response is only observed in spectral curves 301 and 302. Therefore, it is assumed curves 303 and 304 do not significantly contribute to the total surface reflectance at 0.5 um. As such, in step 216, the total surface reflectance at a given wavelength is calculated from only the average surface reflectances of contributing optical bands.

In step 216, the contribution of one optical band to the total surface reflectance at a particular wavelength of the panchromatic band is further assumed to increase as the wavelength approaches the average wavelength for the optical band and vice versa. Therefore, in the various embodiments of the present invention, the reflectance at a particular wavelength of a panchromatic band is calculated by linearly interpolating a reflectance value from the two closest and surrounding average reflectance values of the multi-spectral bands. For wavelengths of the panchromatic band outside the range of average surface reflectance values for the multi-spectral optical bands, the total surface reflectance at those wavelengths is assumed to be based solely on the contribution from the closest average reflectance. Accordingly, at each wavelength of the panchromatic band, the sum of the interpolation weights is equal to 1.

Although the reflectance may trend up or down relative to the estimated reflectance of the outlying band, this approximation of the reflectance based on interpolation represents the best available estimate of the reflectance at these wavelengths based on the assumption of smooth variation of reflectance with wavelength. One of ordinary skill in the art will recognize that outside the spectral range of the multi-spectral bands, the illumination and spectral response of the panchromatic band generally falls off rapidly. As a result, the impact of these outlying wavelengths can be assumed to be minor, if not insignificant.

Figure 6:
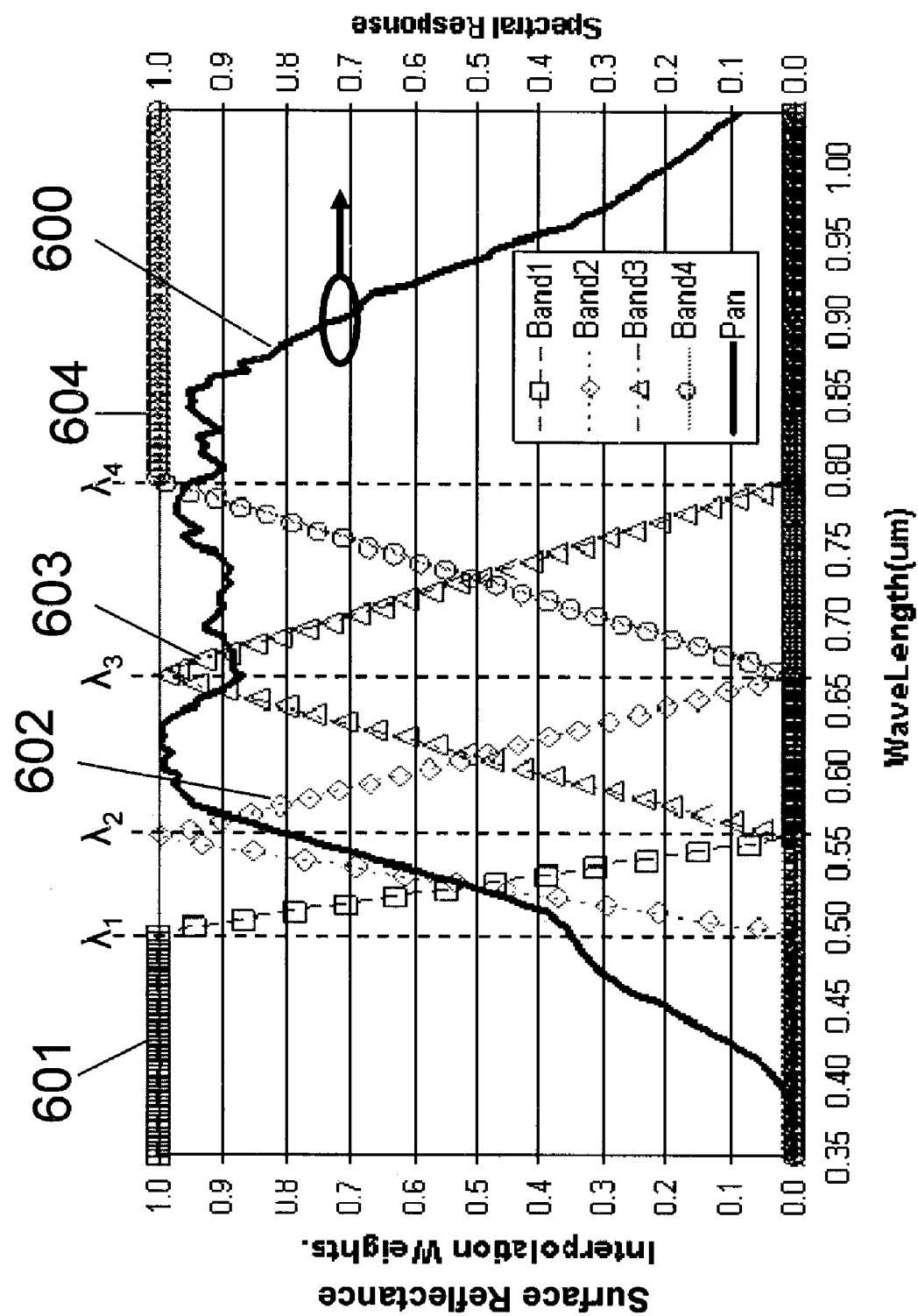
FIG. 6 is a plot showing an example of extracted interpolation reflectance weights according to an embodiment of the present invention.

This is concept is illustrated in FIG. 6. As shown in FIG. 6, for wavelengths of the panchromatic curve 600 less than or equal to $\lambda_1$, the average wavelength of optical band 301 in FIG. 3, the total surface reflectance is assumed to be based solely on the surface reflectance of the first optical band 301. That is, using the average surface reflectance for the first optical band 301 with scaled by a weight equal to 1. More specifically, the total surface reflectance for such wavelengths is assumed to be the same as the average surface reflectance for the first optical band 301. However, for wavelengths greater than $\lambda_1$, the contribution of the first optical band 301 decreases as the panchromatic band wavelengths approach the average wavelength, $\lambda_2$, of the second optical band 302 in FIG. 3. At the same time, the contribution of the second optical band 302 to the total surface reflectance increases as the panchromatic band wavelengths approach $\lambda_2$. Thus, for panchromatic band wavelengths between $\lambda_1$ and $\lambda_2$, the interpolation weights for average reflectances at $\lambda_1$ and $\lambda_2$ vary linearly from 1 to 0 and 0 to 1, respectively, as shown by curves 601 and 602 in FIG. 6. Furthermore, the sum of the interpolation weights is always equal to 1.

Similarly, for wavelengths greater than $\lambda_2$, the contribution of the second optical band 302 to the total surface reflectance decreases as the wavelengths approach the average wavelength, $\lambda_3$, of the third optical band 303 in FIG. 3 and the contribution of the third optical band 303 to the total surface reflectance increases as the panchromatic band wavelengths approach $\lambda_3$, as shown in curves 602 and 603. For wavelengths greater than $\lambda_3$, the contribution of the third optical band 303 to the total surface reflectance decreases as the wavelengths approach the average wavelength, $\lambda_4$, of the fourth optical band 304 in FIG. 3 and the contribution of the fourth optical band increases as the panchromatic band wavelengths approach $\lambda_4$, as shown in curves 603 and 604. In each case, the sum of the interpolation weights is always equal to 1. Finally, for wavelengths of the panchromatic curve 600 greater than or equal to $\lambda_4$, the total surface reflectance is assumed to be based solely on the contribution of the fourth optical band 304. More specifically, the total surface reflectance is assumed to be the average surface reflectance of the fourth optical band 304. That is, using the reflectance of the fourth optical band with scaled by a weight equal to 1, as shown in curve 604.

Once total surface reflectance values have been interpolated in step 216 for each of the wavelengths of the panchromatic band, the weights used for each of the average reflectance values are extracted in step 218. Alternatively, a function describing the interpolation weights as a function of wavelength can also be extracted for each optical band. Once these interpolation weights are extracted in step 218, a reflectance weight $w_b$ for each optical band can be calculated in step 220. For example, the reflectance weights can be calculated by integrating the interpolation weight function for each optical band over the range of wavelengths in the panchromatic response curve. That is, the reflectance weight $w_b$ for each optical band can be calculated by determining the area under each of curves 601, 602, 603, and 604. The reflectance weights $w_b$ can also be normalized according to the spectral response curve of the panchromatic spectral response curve as shown in equation (3) below:

$$w_b = [\int w_{Interpolation}(\lambda)S_{Pan}(\lambda)d\lambda]/[\int S_{Pan}(\lambda)d\lambda] \quad (5)$$

where the normalization results in:

$$\sum_b w_\lambda = 1 \quad (6)$$

After the reflectance weights $w_b$ are calculated and/or normalized in step 220, the final spectral weights $w_b$ are calculated by scaling the reflectance weights $w_b$ based on the modulated radiation transfer functions generated in step 210. That is, each of the reflectance weights is essentially scaled by the ratio of the radiation transfer function for the panchromatic band and an optical band with a reflectance weight. For example, equation (1) applied to the panchromatic image, results in:

$$L_{Total\_Pan} = L_{path\_Pan} + R_{Pan}[L_{Solar\_Pan}\cos(A) + L_{Sky\_Pan}] \quad (7)$$

The normalized reflectance weights $w_b$ are then be used to define the panchromatic reflectance $R_{Pan}$ as follows in equation (8):

$$\sum_b w_\lambda R_\lambda = R_{Pan} \quad (8)$$

Where:
$w_\lambda$ is the reflectance weight for each optical band b as calculated in equation (5), and
$R_\lambda$ is the surface reflectance function (3) modulated for a particular optical band $\lambda$, as previously described.

Therefore, inserting equation (8) into equation (7) provides:

$$L_{Total\_Pan} = L_{path\_Pan} + \left[\sum_b w_\lambda R_{\lambda\_Total}\right]\left[\begin{array}{c}L_{Solar\_Pan}\cos(A) + \\ L_{Sky\_Pan}\end{array}\right] \quad (9)$$

and substituting equation (3) provides:

$$L_{Total\_Pan} = \quad (10)$$
$$L_{path\_Pan} + \left[\sum_b w_\lambda \left\{\frac{[L_b - L_{path\_b}]}{\left[\begin{array}{c}L_{Solar\_b}\cos(A) + \\ L_{Sky\_b}\end{array}\right]}\right\}\right]\left[\begin{array}{c}L_{Solar\_Pan}\cos(A) + \\ L_{Sky\_Pan}\end{array}\right]$$

Furthermore, as pixels in an approximated panchromatic image and an actual panchromatic image should have the same radiance values, for each pixel in an image, $L_{Total\_Pan} = P$ (i, I). Therefore, $$L_{Total\_Pan} = P_0 + \sum_b W_\lambda M_{\lambda,i,j}.$$

Therefore, comparing equation (1) to equation (10), the final spectral weights for each band $W_b$, as a function $w_b$, are defined as follows in equation (11):

$$W_\lambda = w_\lambda[L_{Solar\_Pan}\cos(A) + L_{Sky\_Pan}]/[L_{Solar\_\lambda}\cos(A) + L_{Sky\_\lambda}] \quad (11)$$

Where the wavelengths used for calculating the radiances for each band are the average wavelength of each optical band, as previously described.

In addition to calculating the final spectral weights $W_b$, in step 224, the reflectance weights $w_b$ are also used for determining the offset $P_0$ for equation (1). In particular, substituting equation (11) into equation (10) provides:

$$L_{Total\_Pan} = L_{path\_Pan} + \sum_b W_\lambda[L_\lambda - L_{path\_\lambda}] \quad (12)$$

where rearranging provides:

$$L_{Total\_Pan} = \left(L_{path\_Pan} - \sum_b W_\lambda L_{path\_\lambda}\right) + \sum_b W_\lambda L_\lambda \quad (13)$$

Afterwards, defining $M_{\lambda,i,j} = L_\lambda$ results in the offset $P_0$ being defined as follows in equation (14):

$$P_0 = L_{path\_Pan} - \sum_b W_\lambda L_{path\_\lambda} \quad (14)$$

Once the final spectral weights and offset for equation (1) have been calculated using the reflectance, the values can also be used to determine weights for a calibration function for spatial rather than spectral scaling. That is, using the high resolution information of the panchromatic image to enhance the low resolution multi-spectral image. In general, spatial down-sampling involves down-sampling of radiance values of a plurality of high resolution pixels $p_{00}$, $p_{01}$, $p_{10}$, $p_{11}$ from the panchromatic image to determine a single radiance value for a single lower resolution pixel. A simple averaging process of the radiance values from the high resolution pixels will not give an accurate result because it does not properly account for the point-spread function (PSF) associated with the optics, sensor, and other processing that may have been performed to generate the panchromatic image.

Figure 7:
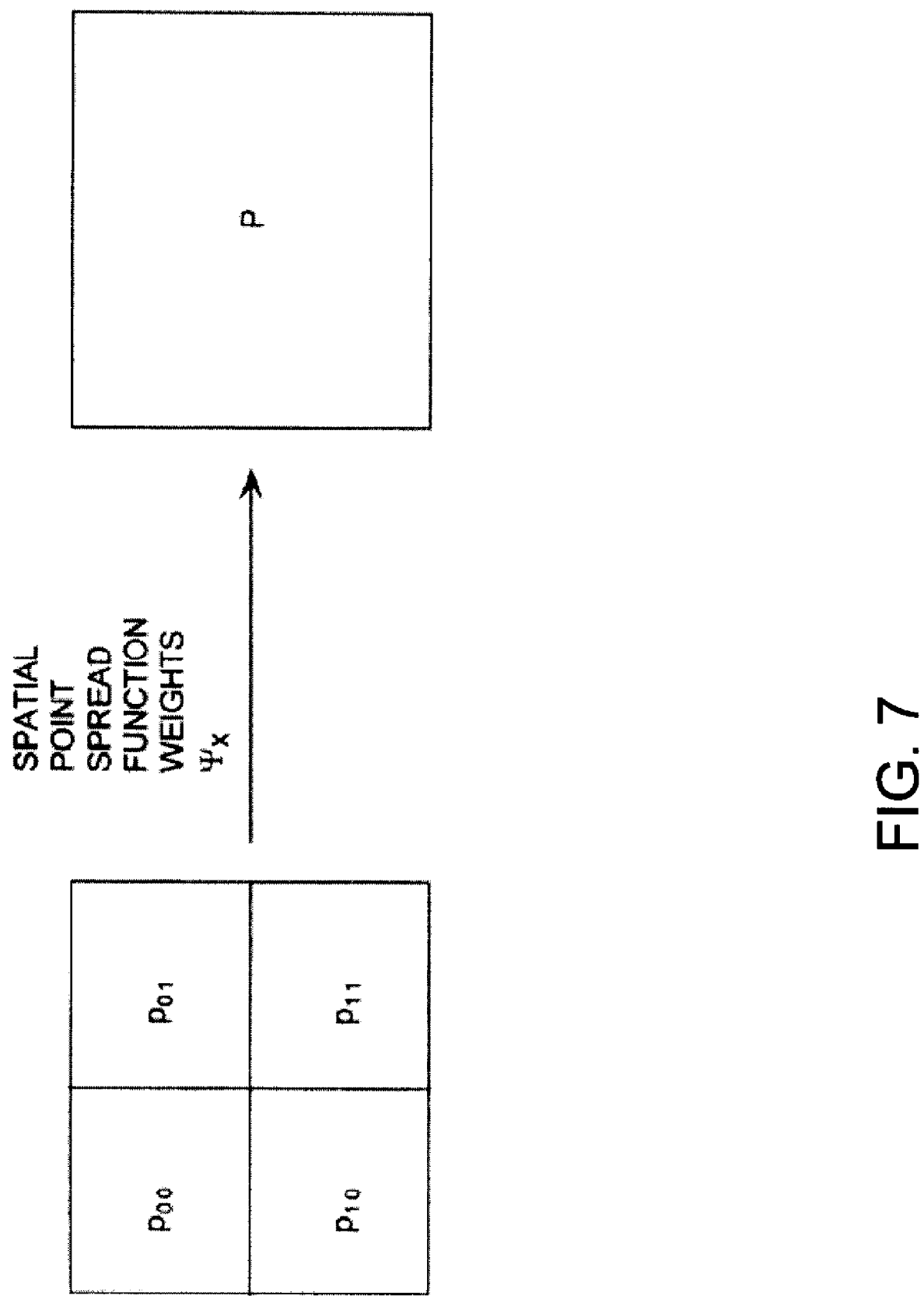
FIG. 7 is a conceptual illustration showing how a point-spread function is used in a downsample processing of a panchromatic image for decreasing the spatial resolution of the panchromatic image that is useful for describing the present invention.
Figure 8:
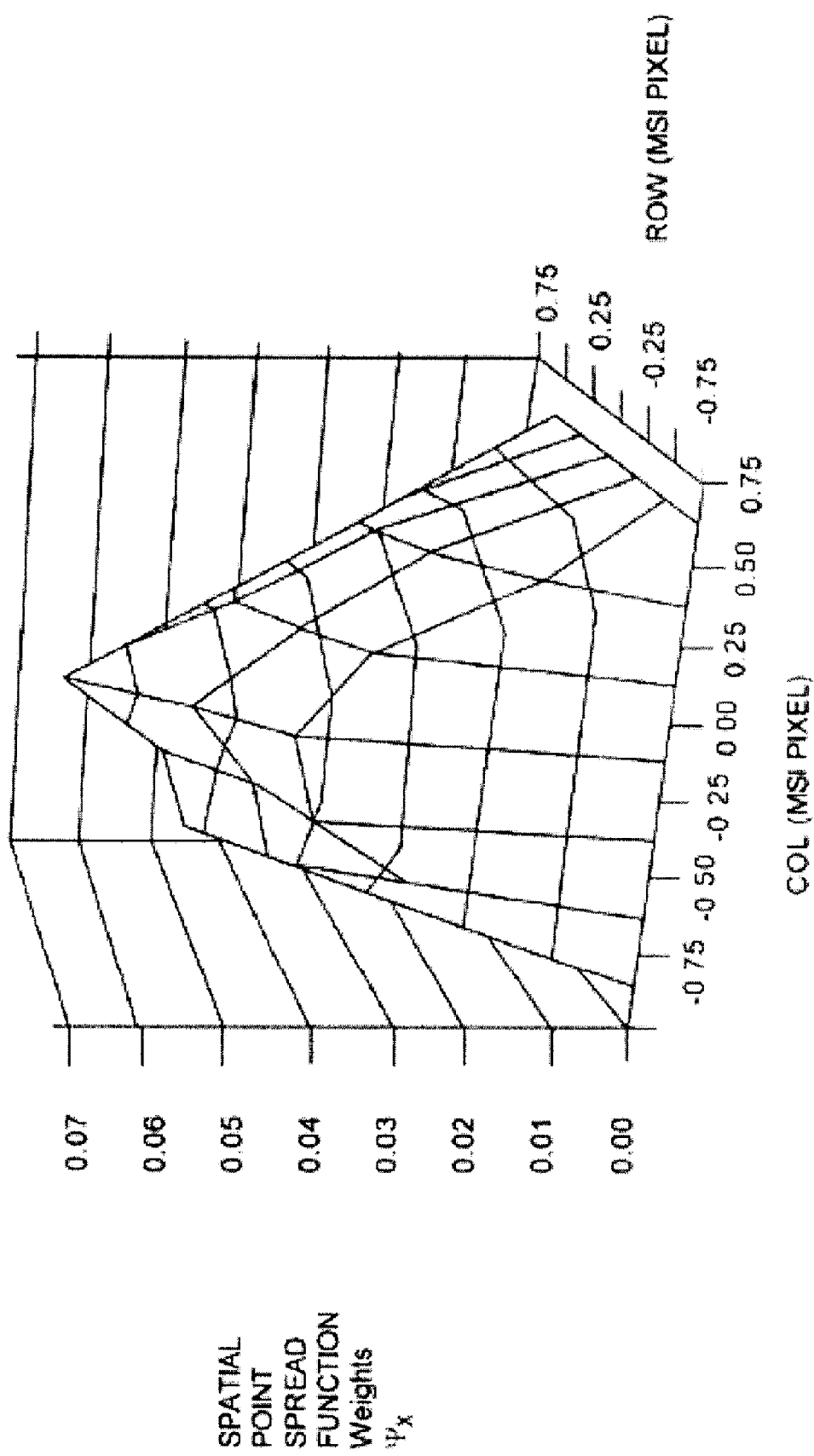
FIG. 8 is a two-dimensional graph which shows an example of a point-spread function that is useful for describing the present invention.

The PSF can be thought of as a mathematical function or table based characterization of the blurring that occurs to a point of light as it processed by the optics, sensor, and other image processing functions associated with the creation of the panchromatic image. FIG. 7 is a graphical representation of an example point-spread function that is useful for understanding this concept. An accurate characterization or representation of the PSF can allow radiance values for different high-resolution pixels within a group of pixels to more accurately be down-sampled to a single larger pixel. This is conceptually illustrated in FIG. 8, which shows a set of four high-resolution pixels being down-sampled to a single larger lower resolution pixel. The PSF represented by $\Psi_x$ operates as a selective weighting factor on each of the high resolution pixels $p_{00}$, $p_{01}$, $p_{10}$, $p_{11}$ to more accurately down-sample the radiance values of these pixels to a single value associated with a larger pixel P. More particularly, the radiance values for the pixels of the panchromatic image can be convolved with the PSF to determine a down-sampled value for a single larger, lower resolution pixel.

The foregoing process can be mathematically expressed in Equation (15) as:

$$MSI_{Pan}(i, j) = \sum_{i,j} p_{i,j}\Psi_{i,j} \quad (15)$$

Where:
$P_{i,j}$ is the radiance value of a high resolution pixel comprising the panchromatic image; and
$\Psi_{i,j}$ is the point-spread function or PSF.

Equations (1) and (15) represent two ways of generating a down-sampled (lower resolution) panchromatic image. One approach begins with the multi-spectral image and the other approach begins with the panchromatic image. However, both approaches yield a lower resolution panchromatic image. Accordingly, the foregoing equations (1) and (15) can be used together to calculate the actual values $\Psi_{i,j}$ (the point-spread function or PSF). Therefore, for each down-sampled pixel:

$$\sum_{i,j} p_{i,j}\Psi_{i,j} = P = \sum_{b} W_\lambda M_\lambda + P_0 \qquad (16)$$

Where:

$P_j$ is the pan radiance of each down-sampled pixel;

$W_\lambda$ is are the spectral weights for each of the optical bands b according to equation (11);

$M_\lambda$ is the radiance value for each pixel for each optical band b and previous defined as $L_b$ according to equation (2);

$P_0$ is the constant offset value according to equation (14)

$P_{i,j}$ is the radiance value of a high resolution pixel comprising the panchromatic image; and $\Psi_{i,j}$ is the point-spread function or PSF.

Using the foregoing equation (16) a matrix equation can be assembled in step 226 for calculating the values $\Psi_{i,j}$ (the point-spread function):

$$\begin{bmatrix} 1 & \cdots & 1 \\ p_{0,0} & \cdots & p_{n,n} \\ \vdots & \vdots & \vdots \end{bmatrix}[\Psi] = \begin{bmatrix} 1 \\ P_{i,j} \end{bmatrix} \qquad (17)$$

where, $$P_{i,j} = \sum_{b} W_\lambda M_\lambda(i, j) + P_0,$$

using the values for $W_b$, $M_b$, $P_0$ as described above.

Equation (17) can then be rewritten as a linear combination of known intensities and unknown weights, as a linear system of equations for all pixels associated with the multi-spectral image in matrix from as the following equation (4):

$$Ax=b \qquad (18)$$

where A is the matrix populated by the specified radiance values from the panchromatic image, x is a vector of unknowns (the PSF), and b is the vector of numerical constants (1, $P_{i,j}$). Those skilled in the art will appreciate that the columns of the matrix are related to the portions of the high resolution panchromatic pixels which are modulated by the PSF.

The first row of the matrix equation imposes the constraint that n×n elements of the PSF sums to 1, which is a defining characteristic of a point-spread function. In this regard it may be noted that the first row of the constant vector on the far right of equation (18) is shown to have a value of 1. The second row of the matrix equation enforces the requirement that the high resolution panchromatic radiance values spectrally down-sampled by the PSF ($p_{0,0} \ldots p_{n,n}$), equal the spectrally down-sampled MSI radiance values ($-M_0 \ldots -M_b$) provided by $P_{i,j}$. The structure of the second row is repeated as a separate row in the matrix equation for each pixel in the MSI image. Those skilled in the art will readily appreciate that a given row of this matrix reduces to equation (19) for a specific pixel of the multi-spectral image.

$$p_{0,0}\Psi_{0,0} + \ldots + p_{n,n}\Psi_{n,n} = \sum_{b} W_\lambda M_\lambda(i, j) + P_0 \qquad (19)$$

Method 200 then continues in step 228 by solving the matrix equation (17) to determine the spatial PSF weighting factors $\Psi_{i,j}$. The solution to the equation is found by using conventional techniques, such as the well known least-squares method.

$$[A_tA]x=A_tb \qquad (20)$$

Where multiplying from the left side of equation (17) by the transpose of the matrix results in a symmetric matrix equation. There are many well know methods for efficiently solving matrix equations of this form.

Those skilled in the art will readily appreciate that the values $W_\lambda$ (the spectral weights for each of the spectral bands) and $\Psi_{i,j}$ (the point-spread function) are advantageous for use in various down-sampling and image fusion processes. For example, the weighting values thus obtained can be used in step 230 for enhancing a panchromatic image with high resolution spectral information.

In step 230, the high resolution spectral information from the multi-spectral image is used to spectrally enhance the panchromatic image in a fusion process. In particular, this can be accomplished by using the spectral weights for each of the spectral bands ($W_\lambda$) determined in step 222. This process can typically involve several steps. The process can begin by creating a number of duplicates images of the panchromatic image. Specifically, one image layer can be created for each of the multi-spectral bands of image data. For example, with the sensor having a multi-spectral response as shown in FIG. 3, four image layers could be created, one for each of the spectral bands associated with each response curve 301, 302, 303, 304. Each of the duplicate panchromatic images can be used to form one image layer for the spectrally enhanced panchromatic image (fused image). The method can then end in step 232.

Alternatively, in step 234, the high resolution spatial information from the panchromatic image is used to spatially enhance the multi-spectral image in a fusion process. In step 234, the multi-spectral image data and the weighting factors for a particular spectral band are used together to modify a respective panchromatic image layer. In particular, the radiance value of each pixel in a first panchromatic image layer can be replaced with a scaled radiance value. The scaled radiance value can be obtained by using the radiance value for a pixel of the multi-spectral image that is mapped to the particular pixel in the panchromatic image using the mapping techniques described above. The radiance value of a pixel from the multi-spectral image used to scale each panchromatic pixel is scaled by the weighting factor ($W_\lambda$) as calculated above. Since the pixels of the multi-spectral image have a lower spatial resolution, the radiance value from one pixel of the multi-spectral image can be used for a plurality of high resolution pixels from the panchromatic image layer. This process can be repeated for each band of optical wavelengths comprising the multi-spectral image. The result is a set of image layers that have the spatial resolution of the panchromatic image, but together can also include the spectral information from the multi-spectral image.

Additional image processing steps can be performed to further enhance the resulting fused image. For example, the point-spread function that has been calculated in step 228 can be subsequently used to spatially down-sample the fused image to the spatial resolution of the multi-spectral image.

Thereafter, the radiance values of each optical band of the fused image can be compared with the radiance values of each optical band of the multi-spectral image. Any differences can be corrected by modifying the radiance values of the pixels comprising the fused image so that they more closely conform to the multi-spectral image. Further, the spectral weights calculated above can be used to spectrally down-sample the fused image to the spectral resolution of the panchromatic image. Thereafter, the radiance values of each pixel of the fused image can be compared with the radiance values of each pixel of the panchromatic image. Any differences can be corrected in this step by modifying the radiance values of the pixels comprising the fused image so that they more closely conform to the panchromatic image.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments can be utilized and derived therefrom, such that structural and logical substitutions and changes can be made without departing from the scope of this disclosure. Figures are also merely representational and can not be drawn to scale. Certain proportions thereof may be exaggerated, while others may be minimized. Accordingly, the specification and drawings are to be regarded in an illustrative rather than a restrictive sense.

Such embodiments of the inventive subject matter can be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose can be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

We claim:

1. A method for processing remotely acquired imagery, comprising:
   obtaining, by at least one electronic circuit, imagery data defining a first image of a panchromatic image type using a sensor characterized by a panchromatic spectral response curve, said first image having a first spatial resolution and a first spectral resolution;
   obtaining, by the electronic circuit, imagery data defining a second image of a multi-spectral image type using at least one other sensor characterized by a plurality of multi-spectral response curves associated with a plurality of optical bands, said second image having a second spatial resolution lower than said first spatial resolution and a second spectral resolution higher than that first spectral resolution;
   deriving, by the electronic circuit, a radiation transfer model based on meta-data associated with at least one of said first and said second image; and
   determining, by the electronic circuit, a set of spectral weights for down-sampling said second image to said first spectral resolution based on said radiation transfer model and said panchromatic and said multi-spectral response curves.

2. The method of claim 1, wherein said determining step further comprises:
   generating a surface reflectance model for each of said optical bands based on said radiation transfer model;
   calculating a set of normalized reflectance weights for each of said optical bands based on said surface reflectance model for each of said optical bands; and
   scaling each of said normalized reflectance weights to obtain said spectral weights for each of said optical bands, said scaling for each optical band based on a ratio of said imagery data in said first image and said imagery data for said second image associated with said optical band.

3. The method of claim 2, the step of calculating further comprising:
   computing average surface reflectance values for each of said optical bands;
   approximating total surface reflectance values for a range of wavelength values in said panchromatic spectral response curve, said approximated total surface reflectance values based on weighted sums of said average surface reflectance values;
   from each of said weighted sums, extracting summation weights associated with each of said optical bands;
   determining said reflectance weights for each of said optical bands based on said extracted summation weights; and
   normalizing said reflectance weights using said panchromatic spectral response curve.

4. The method of claim 3, the step of computing further comprising computing said average surface reflectance values using average wavelength values of said multi-spectral response curves associated with said optical bands.

5. The method of claim 4, the step of approximating further comprising:
   for said wavelength values of said panchromatic spectral response curve between a first and a second of said average wavelength values, linearly interpolating said approximated total surface reflectance values based on a weighted sum of a first and a second of said average surface reflectance values associated with said first and said second average wavelength values.

6. The method of claim 4, the step of approximating further comprising:
   for said wavelengths of said panchromatic spectral response curve greater than or less than all of said average wavelength values of said optical bands, setting said approximated total surface reflectance values to one of said average reflectance values associated with a proximate one of said average wavelength values.

7. The method of claim 1, the step of deriving further comprising extracting said meta-data from said obtained imagery data defining said first and said second image, said extracted meta-data comprising at least one among geographic data, temporal data, and local conditions data.

8. A system for processing remotely acquired imagery, comprising:
   at least one electronic circuit configured to
   receive imagery data defining a first image of a panchromatic image type using a sensor characterized by a panchromatic spectral response curve and imagery data defining a second image of a multi-spectral image type using at least one other sensor characterized by a plurality of multi-spectral response curves associated with a plurality of optical bands, said first image having a first spatial resolution and a first spectral resolution and said second image having a second spatial resolution lower than said first spatial resolution and a second spectral resolution higher than that first spectral resolution, derive a radiation transfer model based on meta-data associated with at least one of said first and said second image, and determine a set of spectral weights for down-sampling said second image to said first spectral resolution based on said radiation transfer model and said panchromatic and said multi-spectral response curves.

9. The system of claim 8, wherein said electronic circuit is further configured during said determining to:

generate a reflectance model for each of said optical bands based on said radiation transfer model, calculate a set of normalized reflectance weights for each of said optical bands based on said reflectance model for each of said optical bands, and scale each of said normalized reflectance weights to obtain said spectral weights for each of said optical bands, said scaling for each optical band based on a ratio of said imagery data in said first image and said imagery data for said second image associated with said optical band.

10. The system of claim 9, wherein said electronic circuit is further configured during said calculating to:

compute average surface reflectance values for each of said optical bands, approximate reflectance values for a range of wavelength values in said panchromatic spectral response curve, said approximated total surface reflectance values based on weighted sums of said average surface reflectance values, from each of said weighted sums, extract summation weights associated with each of said optical bands, determine reflectance weights for each of said optical bands based on said extracted summation weights, and normalize said reflectance weights using said panchromatic spectral response curve to obtain said normalized reflectance weights.

11. The system of claim 10, wherein said average surface reflectance values are computed using average wavelength values of said multi-spectral response curves associated with said optical bands.

12. The system of claim 11, wherein said electronic circuit is further configured during said approximating to:

for said wavelength values of said panchromatic spectral response curve between a first and a second of said average wavelength values, linearly interpolate said approximated total surface reflectance values based on a weighted sum of a first and a second of said average reflectance values associated with said first and said second average wavelength values.

13. The system of claim 11, wherein said electronic circuit is further configured during said approximating to:

for said wavelengths of said panchromatic spectral response curve greater than or less than all of said average wavelength values of said optical bands, setting said approximated total surface reflectance values to one of said average surface reflectance values associated with a proximate one of said average wavelength values.

14. The system of claim 9, wherein said electronic circuit is further configured during said deriving to:

extract said meta-data from said received imagery data defining said first and said second image, said extracted meta-data comprising at least one among geographic data, temporal data, and local conditions data.

15. A computer-readable storage, having stored thereon a computer program for processing remotely acquired imagery, the computer program having a plurality of code sections, the code sections executable by a computer to cause the computer to perform the steps of:

obtaining imagery data defining a first image of a panchromatic image type using a sensor characterized by a panchromatic spectral response curve, said first image having a first spatial resolution and a first spectral resolution;

obtaining imagery data defining a second image of a multi-spectral image type using at least one other sensor characterized by a plurality of multi-spectral response curves associated with a plurality of optical bands, said second image having a second spatial resolution lower than said first spatial resolution and a second spectral resolution higher than that first spectral resolution;

based on meta-data associated with at least one of said first and said second image, deriving a radiation transfer model; and determining a set of spectral weights for down-sampling said second image to said first spectral resolution based on said radiation transfer model and said panchromatic and said multi-spectral response curves.

16. The computer-readable storage of claim 15, wherein said determining step further comprises:

generating a surface reflectance model for each of said optical bands based on said radiation transfer model;

calculating a set of normalized reflectance weights for each of said optical bands based on said surface reflectance model for each of said optical bands; and scaling each of said normalized reflectance weights to obtain said spectral weights for each of said optical bands, said scaling for each optical band based on a ratio of said imagery data in said first image and said imagery data for said second image associated with said optical band.

17. The computer-readable storage of claim 16, the step of calculating further comprising:

computing average surface reflectance values for each of said optical bands;

approximating total surface reflectance values for a range of wavelength values in said panchromatic spectral response curve, said approximated total surface reflectance values based on weighted sums of said average surface reflectance values;

from each of said weighted sums, extracting summation weights associated with each of said optical bands;

determining reflectance weights for each of said optical bands based on said extracted summation weights; and normalizing said reflectance weights using said panchromatic spectral response curve to obtain said normalized reflectance weights.

18. The computer-readable storage of claim 17, the step of computing further comprising computing said average surface reflectance values using average wavelength values of said multi-spectral response curves associated with said optical bands.

19. The computer-readable storage of claim 18, the step of approximating further comprising:

for said wavelength values of said panchromatic spectral response curve between a first and a second of said average wavelength values, linearly interpolating said approximated total surface reflectance values based on a weighted sum of a first and a second of said average surface reflectance values associated with said first and said second average wavelength values, and for said wavelengths of said panchromatic spectral response curve greater than or less than all of said average wavelength values of said optical bands, setting said approximated total surface reflectance to one of said average reflectance values associated with a proximate one of said average surface wavelength values.

20. The computer-readable storage of claim 15, the step of deriving further comprising extracting said meta-data from said obtained imagery data defining said first and said second image, said extracted meta-data comprising at least one among geographic data, temporal data, and local conditions data.

* * * * *